United States Patent [19]

Bowsky

[11] Patent Number: 4,472,223

[45] Date of Patent: Sep. 18, 1984

[54] METHOD OF FORMING GLASS SEAL

[75] Inventor: Benjamin Bowsky, Maineville, Ohio

[73] Assignee: Emerson Electric Co., St. Louis, Mo.

[21] Appl. No.: 432,984

[22] Filed: Oct. 6, 1982

[51] Int. Cl.³ ............................................ B32B 31/00
[52] U.S. Cl. ...................:.............. 156/153; 156/322; 156/634; 427/307; 428/432; 428/467; 428/702
[58] Field of Search ................. 156/153, 634, 89, 322; 428/432, 469, 702; 427/307

[56] References Cited

U.S. PATENT DOCUMENTS

| | | | |
|---|---|---|---|
| 2,502,855 | 4/1950 | Kingston . | |
| 2,690,402 | 9/1954 | Crehan | 427/307 |
| 3,193,424 | 7/1965 | Scott | 156/153 |
| 3,510,343 | 5/1970 | Twells | 428/432 |
| 4,296,275 | 10/1981 | Bowsky | 339/192 RL |

FOREIGN PATENT DOCUMENTS 2092621A 8/1982 United Kingdom .
2094838A 9/1982 United Kingdom .

*Primary Examiner*—Jay H. Woo
*Assistant Examiner*—Timothy W. Heitbrink
*Attorney, Agent, or Firm*—Polster, Polster and Lucchesi

[57] ABSTRACT

In the process of making a direct glass seal to stainless steel containing chromium, the steel having been annealed in a reducing atmosphere, a chromium-depleted layer of the surface of the steel is removed to expose core material containing sufficient chromium to produce a chromium oxide film, a chromium oxide film is formed and glass is bonded to the metal along the chromium oxide film.

3 Claims, No Drawings

METHOD OF FORMING GLASS SEAL

BACKGROUND OF THE INVENTION

It has in the past been found difficult to obtain consistent, durable, direct seals between glass and stainless steel, for example, 304L stainless steel, the composition of which is approximately 20% chromium, 10% nickel and 70% iron, that has been annealed in a reducing atmosphere in the process of rolling.

It has been discovered that the reducing atmosphere, for example, hydrogen, depletes the chromium from the surface to a depth of 0.0001" or 0.0002" in a 0.015" or 0.03" sheet. The bonding to steel of glass seals, of the type used in making terminals for hermetic motors, for example, is greatly facilitated by a film of chromium oxide. It has been found that by removing the chromium-depleted layer from the stainless steel to a depth at which there is sufficient chromium to produce a chromium oxide film, and forming the film, a highly reliable glass-to-metal seal can be formed consistently.

SUMMARY OF THE INVENTION

In accordance with this invention, generally stated, a process of making a direct glass seal to stainless steel containing chromium, the steel having been annealed in a reducing atmosphere, is provided in which a chromium depleted layer is removed from the surface of the steel to expose core material containing sufficient chromium to produce a continuous chromium oxide film, producing the continuous chromium oxide film through the area to which glass is to be bonded and bonding glass to the metal along the chromium oxide film. The removal can be accomplished by mechanical abrasion or by chemical etching.

DESCRIPTION OF THE PREFERRED EMBODIMENTS

Stainless steel strip, in the specific example, 304L stainless coiled strip of the type produced by Ulbrich Stainless Steels and Special Metals Inc., annealed in a hydrogen furnace, a reducing atmosphere, is sandblasted to remove approximately 0.0002" of surface, to expose the core material. The sheet before being sandblasted has a gray cast. After being abraded, the surface takes on a greenish cast, indicating that a film of chromium oxide, $Cr_2O_3$, has formed. In forming hermetic terminals, of the type shown in Bowsky Pat. No. 4,296,275, for example, the abraded sheet can be hydroformed, and terminal pins sealed in glass bonded to the stainless steel.

The glass used in the sealing can be of any of the usual sealing glasses used in glass-to-metal seals, sold commercially by Corning Glass Works or the Fusite Division of Emerson Electric Co., for example.

Other means of abrading the surface, such as grinding, wire brushing, or chemical etching can be used, although in the latter, it is necessary to avoid leaching chromium from the surface.

The surface of stainless steel strip that has been stamped or hydroformed can be abraded after the piece is formed in the area in which glass is to be bonded to the steel. Sandblasting or, depending upon the configuration of the piece, grinding, can be used for this purpose. It is important that the area of the seal be abraded in such a way as to permit the formation of a continuous film of chromium oxide.

Other stainless steels than 304L can be treated in this way, provided they contain enough chromium to form a chromium oxide film. The depth of surface to be removed will depend upon the type of steel and the type of treatment, but it has been found to be very thin, as indicated, in commercially available stainless steel strip. In any event, the proper depth of abrasion is easily determined by observing the appearance of a green cast to the surface.

I claim:

1. The process of making a direct glass seal to stainless steel containing chromium, comprising annealing said steel in a reducing atmosphere, removing from the surface of said steel through the area in which glass is to be bonded to the steel a chromium depleted layer to expose core material containing sufficient chromium to produce a continuous chromium oxide film, forming said chromium oxide film, and bonding glass to said steel along said chromium oxide film.

2. The process of claim 1 wherein the chromium depleted layer is removed by mechanically abrading said layer.

3. The process of claim 1 or 2 wherein the stainless steel is 304L stainless.

* * * * *